(12) United States Patent
Gonia

(10) Patent No.: US 9,294,936 B2
(45) Date of Patent: Mar. 22, 2016

(54) SYSTEM AND METHOD FOR IMPROVED LOCATION SYSTEM ACCURACY

(71) Applicant: Honeywell International Inc., Morristown, NJ (US)

(72) Inventor: Patrick S. Gonia, Maplewood, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/774,066

(22) Filed: Feb. 22, 2013

(65) Prior Publication Data

US 2014/0051459 A1 Feb. 20, 2014

Related U.S. Application Data

(60) Provisional application No. 61/683,056, filed on Aug. 14, 2012.

(51) Int. Cl.
| | |
|---|---|
| *H04W 24/00* | (2009.01) |
| *G01S 5/00* | (2006.01) |
| *G01S 5/02* | (2010.01) |
| *H04W 64/00* | (2009.01) |
| *G01S 5/14* | (2006.01) |

(52) U.S. Cl.
CPC .............. *H04W 24/00* (2013.01); *G01S 5/0036* (2013.01); *G01S 5/0205* (2013.01); *G01S 5/14* (2013.01); *H04W 64/00* (2013.01); *H04W 64/003* (2013.01); *H04W 64/006* (2013.01)

(58) Field of Classification Search
CPC ....... G01S 5/0036; G01S 5/0205; G01S 5/14; H04W 24/00; H04W 48/04; H04W 48/17; H04W 48/18; H04W 48/20; H04W 8/26

USPC ................... 715/847, 764; 702/188, 150, 24; 370/254, 338; 455/456.1, 41.2
See application file for complete search history.

(56) References Cited

U.S. PATENT DOCUMENTS

| | | | |
|---|---|---|---|
| 5,767,390 | A | 6/1998 | Chapman, IV |
| 5,771,004 | A | 6/1998 | Suppelsa et al. |
| 5,922,943 | A | 7/1999 | Chapman, IV |
| 6,138,512 | A | 10/2000 | Roberts et al. |

(Continued)

FOREIGN PATENT DOCUMENTS

WO    WO 2010142139 A1 * 12/2010

OTHER PUBLICATIONS

Junjie Chen et al., A Weighted Compensated Localization Algorithm of Nodes in Wireless Sensor Networks, Third International Workshop on Advanced Computational Intelligence, Aug. 26-27, 2010, pp. 379-384, Suzhou, Jiangsu, China.

(Continued)

*Primary Examiner* — Jean Gelin
(74) *Attorney, Agent, or Firm* — Conley Rose, P.C.; Kristin Jordan Harkins

(57) ABSTRACT

A plurality of wireless devices can obtain location related information from members of a plurality of location anchors located throughout a region being monitored. The devices can each send probes to the location anchors. The anchors which receive a probe can each respond with a signal carrying at least an anchor address. Each of the devices can process the respective received signal to establish a distance parameter, and, can forward the address and the distance parameter to a displaced location estimating engine.

19 Claims, 2 Drawing Sheets

(56) References Cited

U.S. PATENT DOCUMENTS

| | | |
|---|---|---|
| 6,182,497 B1 | 2/2001 | Krajci |
| 6,252,510 B1 | 6/2001 | Dungan |
| 6,772,071 B2 | 8/2004 | Gilbert et al. |
| 7,019,637 B1 | 3/2006 | Johnson et al. |
| 7,345,582 B2 | 3/2008 | Gould |
| 7,522,043 B2 | 4/2009 | English et al. |
| 7,609,159 B2 | 10/2009 | Benson et al. |
| 7,904,244 B2 | 3/2011 | Sugla |
| 7,994,926 B2 | 8/2011 | Longman et al. |
| 8,099,130 B1 | 1/2012 | Halla et al. |
| 2003/0146835 A1 | 8/2003 | Carter |
| 2004/0061646 A1 | 4/2004 | Andrews et al. |
| 2004/0149918 A1 | 8/2004 | Craig et al. |
| 2004/0204915 A1 | 10/2004 | Steinthal et al. |
| 2004/0215532 A1 | 10/2004 | Boman et al. |
| 2005/0057370 A1 | 3/2005 | Warrior et al. |
| 2006/0082462 A1 | 4/2006 | Crook |
| 2008/0168826 A1 | 7/2008 | Saidi et al. |
| 2009/0139299 A1 | 6/2009 | Prince |
| 2009/0188302 A1 | 7/2009 | Rolff et al. |
| 2009/0212995 A1 | 8/2009 | Wu et al. |
| 2010/0103844 A1* | 4/2010 | Kim ................................ 370/254 |
| 2011/0161044 A1 | 6/2011 | Gonia et al. |
| 2011/0161885 A1* | 6/2011 | Gonia et al. .................. 715/847 |
| 2012/0083289 A1* | 4/2012 | Li et al. ...................... 455/456.1 |
| 2013/0185000 A1* | 7/2013 | Fabes et al. ..................... 702/24 |

OTHER PUBLICATIONS

Elisabetta Farella et al., Aware and Smart Environments: The Casattenta Project, Microelectronics Journal 41 (2010) pp. 697-702.

Search Report for corresponding EP application 13178424.1, dated Oct. 27, 2014.

* cited by examiner

SYSTEM AND METHOD FOR IMPROVED LOCATION SYSTEM ACCURACY

CROSS-REFERENCE TO RELATED APPLICATION

This application claims the benefit of the filing date of U.S. Provisional Application Ser. No. 61/683,056 filed Aug. 14, 2012, entitled, "System and Method for Improved Location System Accuracy". The '056 application is hereby incorporated herein by reference.

FIELD

The application pertains to systems and methods for establishing locations of mobile wireless devices, such as gas detectors, radiation detectors or the like, in a region being monitored. More particularly, the application pertains to such systems and methods wherein the mobile devices obtain location indicating information from fixed location anchors and forward that information to a location establishing engine.

BACKGROUND

Portable gas detectors which can be used to monitor one or more conditions in a region of interest can wirelessly communicate with a Wi-Fi based network of access points. Each of the access points of the network can provide IEEE 802.11 access service. The members of the network can forward detector generated information as to gas concentrations and detector location indicating information to a location manager which can incorporate a location determining engine.

Systems of the type described above have been disclosed in US Patent Application Publication 2011/0161885 published Jun. 30, 2011, application Ser. No. 12/695,736 filed Jan. 28, 2010, entitled "WIRELESS LOCATION-BASED SYSTEM AND METHOD FOR DETECTING HAZARDOUS AND NON-HAZARDOUS CONDITIONS, and US Patent Application Publication 2011/0161044 published Jun. 30, 2011, application Ser. No. 12/959,250 filed Dec. 2, 2010, entitled "WIRELESS LOCATION-BASED SYSTEM FOR DETECTING HAZARDOUS CONDITIONS. The above two published applications, 0161885 and 0161044 are both assigned to the Assignee hereof and are hereby incorporated by reference.

Wi-Fi based wireless location system accuracy is known to exhibit a probability distribution of location error when attempting to estimate the location of a mobile device. For example, the empirical data suggests the average location estimate may be accurate to within 35% of the average wireless local area network (WLAN) access point (AP) spacing when estimated using received signal strength indication (RSSI) information. However some applications may require more accuracy than would be provided by the WLAN infrastructure. Thus in order to provide adequate location system accuracy in a typical WLAN system, it may be necessary to deploy additional access points beyond those necessary for WLAN coverage. Installation of these additional access points may be expensive in terms of material cost of additional APs and also either installation cost of backhaul communications wiring e.g. for Ethernet or material cost of additional radios in the APs to provide equivalent wireless back haul communications. A lower cost solution to improve location accuracy would be desirable.

DETAILED DESCRIPTION

Figure 1:
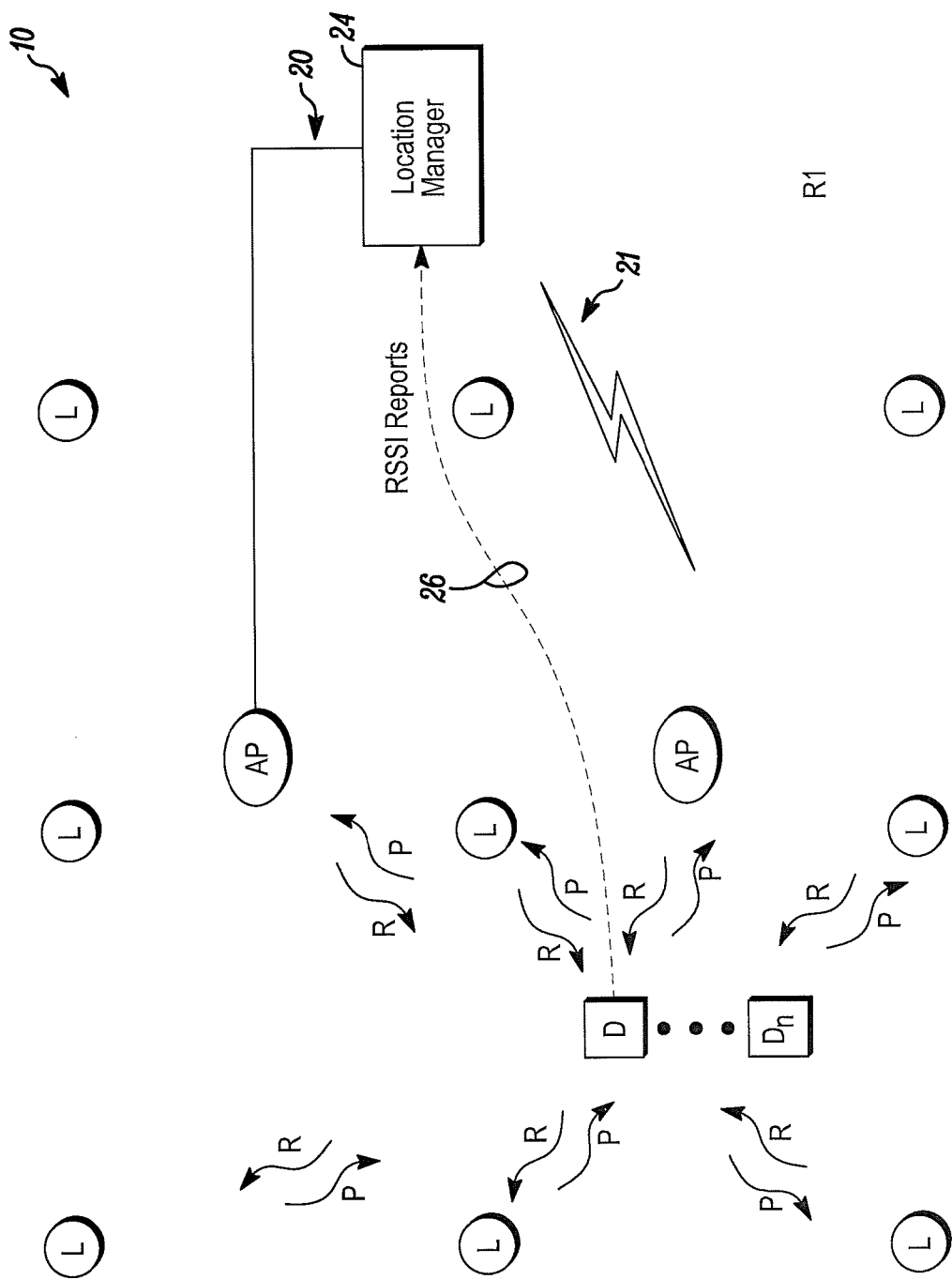
FIG. 1 illustrates a system which embodies a detector locating system in accordance herewith.

While disclosed embodiments can take many different forms, specific embodiments hereof are shown in the drawings and will be described herein in detail with the understanding that the present disclosure is to be considered as an exemplification of the principles hereof, as well as the best mode of practicing same, and is not intended to limit the claims hereof to the specific embodiment illustrated.

In embodiments hereof, the mobile devices, also interchangeably referred to herein as detectors, transmit probes into portions of a region being monitored. Location anchors distributed in the region which receive the probes can each transmit at least a location indicating address that can be read by the receiving mobile device. The mobile device can then make signal strength measurements of responses from members of a plurality of location anchors L distributed in a region being monitored. Alternately, round trip time-of-flight measurements can be made of an interval between the time of the request and time of the response. The address and signal strength (RSSI), or, time-of-flight information can be transmitted from the mobile device to a location manager which can then estimate the location of the device in the region.

Because it is the mobile devices that communicate with the location manager, and not the location anchors, the location anchors advantageously each have a lower total installed cost, that is lower cost inclusive of installation cost and materials cost, than a corresponding access point would have since they need not provide back-haul communications. The elimination of back-haul communications equipment offers an opportunity to save (installed) cost at each anchor location. Hence more location anchors can be provided, at the same or lesser cost, for improved location accuracy.

For example, in the location anchors, there is no need for Ethernet port electronics or Ethernet wire installation (for back haul communications). Alternatively to avoid having to install Ethernet wiring the access points may utilize an additional back haul radio. The location anchors in the present embodiments do not need back haul radios. So the relative total installed cost for a location anchor can be reduced as compared to an access point FIG. 1 illustrates aspects of a wireless regional monitoring system 10 installed in a region R1. Access points AP provide wireless local area network service throughout the region R1 via backhaul wires 20 or via a wireless backhaul link 21 to the location manager 24. Members of a plurality of relatively low cost location anchors, L are distributed throughout the region R1. The anchors L can provide responses R to wireless probes P received from mobile devices, or units, for example gas detectors D . . . Dn, moving through the region R1 by transmitting, at least location anchor address data which is related to the location of the respective location anchor L.

The detectors Di, upon receiving the responses R to the probes P from the anchors L, can read the address of the responding location anchor and can measure the associated RSSI or time-of-flight of the response R. The results of such measurements, along with address information for the respective location anchor, can then be forwarded via one of the APs to the Location Manager which makes estimates of the position of the respective devices, such as detectors D. The dotted line 26 indicates the relay of this measurement information from the detector D via one of the APs to the location manager 24. Advantageously, the location anchors L exhibit a lower total installed cost than the APs as the location anchors need not support Ethernet electronics or connectors and need not be wired for Ethernet backhaul communications nor contain additional backhaul radios.

In yet another aspect, the detectors, such as detector Di can communicate directly with the location manager 24 provided it supports an internal AP or e.g. Wi-Fi Direct functionality. It will also be understood that other forms of communications between the detectors, such as detector Di, and the Location Manager 24 come within the spirit and scope of the invention.

Figure 2:
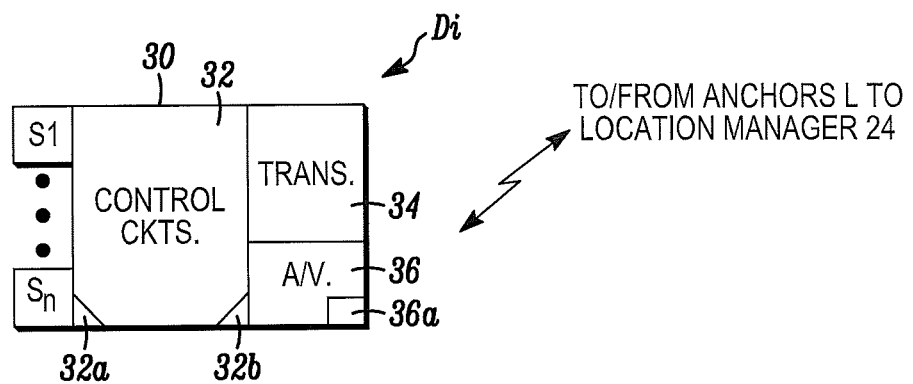
FIG. 2 illustrates a block diagram of a detector usable in the system of FIG. 1.

FIG. 2 illustrates a block diagram of an exemplary mobile unit, such as the detector Di. Detector Di includes a housing 30 which can be carried on or about the person of someone working in or moving through the region R1. Housing 30 can carry one or more ambient condition sensors, S1, S2 . . . Sn responsive for example to gas, smoke, temperature, radiation, or the like all without limitation.

Control circuits 32, carried by housing 30, are coupled to the one or more sensors Si, and to a transceiver 34. Transceiver 34 can be implemented as an RF transceiver, for example, and without limitation. The control circuits can be implemented, at least in part, by a programmable processor 32a which executes pre-stored instructions in a storage unit 32b. Housing 30 can also carry an audio/visual output device 36 with operator controls 36a.

It will be understood that the detector Di can communicate via transceiver 34 with the location anchors L in the region R1. Based on responses from the location anchors L, detector Di can in turn communicate wirelessly with the location manager 24, directly or via access points AP, without limitation, as discussed above.

Figure 3:
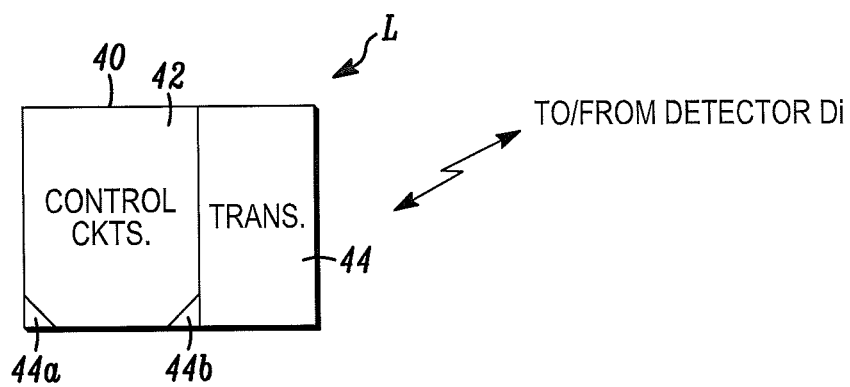
FIG. 3 illustrates a block diagram of a location anchor usable in the system of FIG. 1.

FIG. 3 illustrates a block diagram of an exemplary location anchor, such as one of the anchors L. Anchor L includes a housing 40 which carries control circuits 42 coupled to a transceiver 44. Transceiver 44 can be implemented as an RF transceiver, for example, and without limitation.

It is an important aspect of the embodiment 10 disclosed in FIGS. 1-3 that the transceiver 44 need only be capable of communicating with the detectors, such as the detector Di in the region R1. The detector Di communicates with the location manager 24, via circuitry not located in the location anchors, namely transceiver 34 and not transceiver 44. These communications are apart from the operation of the location anchors L, and take place, either via an access point, AP or via a direct link to the location manager. As a result, the structure of the location anchors L is simplified. No Ethernet communications circuits, or back haul radios, need be installed in the anchors L. Hence, to reduce location error, numerous anchors L can be installed throughout the region R1, at a reduced expense compared to a similar number of access points AP.

In summary, location anchors may respond to probes from respective mobile devices such that the mobile devices may measure the RSSI of the respective response, or time-of-flight from transmission of the probe to receipt of a response from a respective anchor. The mobile devices may then report the measured RSSI from location anchors, or time-of-flight to a location manager where estimated positions of the respective mobile devices may be determined. The location anchors can also identify themselves, by providing address information, which the mobile devices can forward to the location manager.

In embodiments hereof, total installed cost for the additional location anchors may be reduced as compared to the equivalent total installed cost of the same number of access points. This reduction is due to eliminating the back-haul communications equipment required by an access point.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown, or sequential order, to achieve desirable results. Other steps may be provided, or steps may be eliminated, from the described flows, and other components may be added to, or removed from the described embodiments.

The invention claimed is:

1. A method of providing location related information to a location manager comprising:

transmitting, via a wireless local area network, a probe from at least one mobile device to at least one location anchor of a plurality of location anchors in a region to be monitored, wherein each location anchor of the plurality of location anchors has a predetermined address, where each location anchor is not wired for Ethernet backhaul communications nor contains a backhaul radio, and where the robe is received at the at least on location anchor of the plurality of location anchors;

receiving, by at least one mobile device from the at east one location anchor via the wireless local area network, a signal with the predetermined address;

detecting the signal at the at least one mobile device; and forwarding the predetermined address and the signal as the location related information directly from the at least one mobile device to the location manager, wherein each location anchor of the plurality of location anchors includes a transceiver capable of communicating with the at least one mobile device and incapable of communicating with the location manager, and where forwarding the location related information includes establishing, at least in part, a wireless communications path between the at least one mobile device and the location manager exclusive of any of the plurality of location anchors.

2. The method as in claim 1, wherein the detecting of the signal detects one of a signal strength parameter or time of flight of the received signal.

3. The method as in claim 1, wherein the plurality of location anchors receive the probe and transmit a probe response in a format that is compatible with the IEEE STD 802.11-2007 standard.

4. The method as in claim 1, wherein the mobile device comprises circuitry that transmits the probe and forwards the location related information from the mobile device to the location manager.

5. The method as in claim 4, further comprising: sensing at least one ambient condition at the at least one mobile device.

6. The method as in claim 1, wherein the plurality of location anchors are the only devices with location anchor functionality in the region.

7. The method as in claim 1, wherein the at least one mobile device comprises at least one sensor of an ambient condition selected from a group consisting of gas sensors, smoke sensors, temperature sensors, and radiation sensors.

8. A regional monitoring system comprising:

a plurality of location anchors disposed within a region to be monitored, wherein each location anchor of the plurality of location anchors is not wired for Ethernet backhaul communications nor contains a backhaul radio, and wherein the plurality of location anchors are the only location anchors in the region;
a location manager, and
at least one mobile device configured to communicate with one or more location anchors of the plurality of location anchors and receive responses from the one or more location anchors via a wireless local area network, where each response includes an anchor address of the corresponding location anchor,
wherein the at least one mobile device is configured to measure at least one parameter associated with a received response of the received responses and forward a result of that measurement and the anchor address as location related information to the location manager via the wireless local area network and via circuitry other than circuitry at the one or more location anchors, wherein the location manager is configured to estimate the position of the mobile device based on the location related information, and
wherein each location anchor comprises a transceiver configured to communicate with the at least one mobile device and incapable of communicating with the location manager.

9. The system as in claim 8, wherein each location anchor of the plurality of location anchors comprises circuitry configured to respond to a communication received from the at least one mobile device and transmits the response to the at least one mobile device.

10. The system as in claim 9, where the at least one mobile devices comprises circuitry configured to measure at least one of RSSI of signals received from location anchors, or time-of-flight of signals traveling between the at least one mobile device and the one or more location anchor of the plurality of location anchors.

11. The system as in claim 10, wherein the at least one mobile device is configured to communicates the location related information, including the at least one of RSSI signals received from the location anchors or time-of-flight of the signals traveling between the at least one mobile device and the one or more location anchor, to the location manager via a respective access point of the wireless local area network.

12. The system as in claim 8, wherein the one or more location anchors are configured to communicate with the at least one mobile device in response to probes from the at least one mobile device.

13. The system as in claim 8, wherein the at least one mobile device is configured to communicate the location related information to the location manager via a respective access point of the wireless local area network.

14. The system as in claim 8, wherein the at least one mobile device is configured to directly forward the result and the anchor address to the location manager.

15. The system as in claim 8, wherein the at least one mobile device comprises at least one sensor of an ambient condition selected from a group consisting of gas sensors, smoke sensors, temperature sensors, and radiation sensors.

16. A system comprising:
a plurality of mobile wireless devices configured to derive location related information from members of a plurality of location anchors located throughout a region being monitored, wherein each location anchor of the plurality of location anchors is located throughout the region, wherein each location anchor of the plurality of location anchors is not wired for Ethernet backhaul communications nor contains a backhaul radio,
wherein the plurality of mobile wireless devices are configured to each send probes to the plurality of location anchors via a wireless local area network,
wherein at least some of the location anchors are configured to respond to the probes with a signal carrying an anchor address via the wireless local area network,
wherein at least one mobile device of the plurality of mobile wireless devices is configured to process the received signal to obtain a measure of distance to a responding location anchor and forward that measure of distance and the associated address directly to a displaced location estimating engine,
wherein the location estimating engine is configured to produce a location estimate for the mobile device, and
wherein each of the location anchors comprises a transceiver capable of communicating with the plurality of mobile wireless devices and incapable of communicating with the location estimating engine.

17. The system as in claim 16, wherein the plurality of mobile wireless devices are configured to communicate with the location estimating engine via an access point of the wireless local area network.

18. The system as in claim 16, wherein at least some of the plurality of mobile devices comprise at least one sensor of an ambient condition selected from a group consisting of gas sensors, smoke sensors, and radiation sensors.

19. The system as in claim 16, wherein the plurality of location anchors are the only devices with location anchor functionality in the region.

* * * * *